United States Patent [19]
Oda

[11] Patent Number: 6,060,021
[45] Date of Patent: May 9, 2000

[54] METHOD OF STORING TRICHLOROSILANE AND SILICON TETRACHLORIDE

[75] Inventor: Hiroyuki Oda, Tokuyama, Japan

[73] Assignee: Tokuyama Corporation, Yamaguchi-ken, Japan

[21] Appl. No.: 09/070,733

[22] Filed: May 1, 1998

[30] Foreign Application Priority Data

May 7, 1997 [JP] Japan .................................. 9-116751

[51] Int. Cl.⁷ .......................... B01J 19/00; C01B 33/02
[52] U.S. Cl. .............................. 422/40; 422/41; 423/342; 423/347; 423/348; 423/349
[58] Field of Search ................ 422/40, 41; 423/347, 423/348, 349, 342

[56] References Cited

U.S. PATENT DOCUMENTS

| | | | |
|---|---|---|---|
| 3,068,078 | 12/1962 | Kersting | 423/349 |
| 4,092,446 | 5/1978 | Padovani et al. | 427/213 |
| 4,213,937 | 7/1980 | Padovani et al. | 422/142 |
| 4,340,574 | 7/1982 | Coleman | 423/347 |
| 5,067,989 | 11/1991 | Yokota et al. | |

FOREIGN PATENT DOCUMENTS 3-80193  4/1991  Japan .

*Primary Examiner*—Krisanne Thornton
*Attorney, Agent, or Firm*—Birch, Stewart, Kolasch & Birch, LLP

[57] ABSTRACT

Trichlorosilane for producing polycrystal silicon and tetrachlorosilane for producing trichlorosilane are storaged under hydrogen gas as a sealing gas. High-purity polycrystal silicon is provided.

15 Claims, 2 Drawing Sheets

METHOD OF STORING TRICHLOROSILANE AND SILICON TETRACHLORIDE

BACKGROUND OF THE INVENTION

The present invention relates to a method of storing trichlorosilane and silicon tetrachloride. More specifically, it relates to a method of storing trichlorosilane and silicon tetrachloride for the production of high-purity polycrystal silicon which is a raw material of silicon for devices.

The most general method of producing high-purity polycrystal silicon uses trichlorosilane as a raw material. Trichlorosilane is first purified by distillation and separated into high-purity trichlorosilane, other chlorosilanes and impurities to be discarded. Thereafter, the purified trichlorosilane obtained by distillation is reduced by reacting it with hydrogen to produce high-purity polycrystal silicon. Particularly, a method of producing a rod-shaped deposit is called "Siemens method" and widely and commonly employed.

Since the above purified trichlorosilane has a low boiling point and readily reacts with moisture contained in the air, it is extremely dangerous and hence, stored in a pressure-resistant tank. When it contacts the air, it reacts with oxygen in the air and may ignite. Therefore, its storage tank must prevent it from contacting the air by sealing with a gas which is virtually inactive with trichlorosilane. A nitrogen gas has been used as a means for preventing trichlorosilane from contacting the air (to be simply referred to as "sealing means" hereinafter).

It has been believed so far that nitrogen is inactive with trichlorosilane. The inventors of the present invention investigated the influence of nitrogen on the whole production process of polycrystal silicon. Surprisingly, they have found the following two facts.

One of the facts is that nitrogen does not react with trichlorosilane directly, but it forms a nitride when it is hot, for example, when supplied to a precipitation reaction. To precipitate polycrystal silicon, hydrogen and gasified purified trichlorosilane are used. The surface of a polycrystal silicon rod produced by supplying these gases has a fair gray color in a normal state. The present inventor has conducted experiments in which after polycrystal silicon was precipitated through the reaction of trichlorosilane with hydrogen, the supply of trichlorosilane was stopped and nitrogen was supplied. At this point, a current for heating polycrystal silicon was kept applied. After nitrogen was supplied for about 1 minute, a current was stopped as usual and polycrystal silicon was cooled and taken out. The surface of the rod changed its color to black by a nitride.

The other fact is that nitrogen, unexpectedly, dissolves in trichlorosilane extremely easily. The experiments revealed that about 2,300 ppm (molar fraction) of nitrogen dissolves in trichlorosilane at normal temperature. This figure is hardly conceivable from common knowledge, but has been verified from both aspects by measurement by gas chromatography and checking of the mass balance of nitrogen in a polycrystal silicon production plant.

By discovering the above two facts, a reduction in the quality of polycrystal silicon caused by the following has been concerned. In an attempt to store trichlorosilane, if the above-described means of preventing it from contacting with the air by charging nitrogen, the charged nitrogen dissolves in trichlorosilane. When the trichlorosilane is used to precipitate polycrystal silicon, the above nitride is formed inside the polycrystal silicon rod. Further, hydrogen is used in a precipitation reaction to increase the productivity of silicon. In general, this hydrogen is mixed with trichlorosilane before it enters a reactor. Chlorosilane and hydrogen chloride are separated from the exhaust gas from the reactor and this hydrogen is recycled. When nitrogen released from trichlorosilane is mixed in the reactor, nitrogen mixed into the hydrogen is accumulated in a hydrogen recycling line. As a result, the concentration of nitrogen contained in the gas to be supplied to the reactor increases gradually.

Since a nitride contained in polycrystal silicon which is precipitated using hydrogen and trichlorosilane containing nitrogen has a low concentration, it cannot be observed directly by currently known analytical means. Meanwhile, although the cause is not yet clearly known, it has been known that a reduction in the production yield of devices by the occurrence of OSF (Oxidation-Induced Stacking Fault) or the like is influenced by a process for producing polycrystal silicon. For example, as disclosed in JP-A Hei 3-80193 (the term "JP-A" as used herein means an "unexamined published Japanese patent application"), it is often said that a heavy metal causes it, but it is conceivable that the heavy metal, as a matter of fact, is not solely responsible for it. It is conceivable that a silicon nitride remains as a solid matter when polycrystal silicon is pulled up as monocrystals due to an extremely high melting point of a silicon nitride. Although it cannot be determined based on the above fact whether a nitride influences the yield, it can be at least said that there is a great possibility that the nitride is one of the primary factors.

It is an object of the present invention to provide a method of storing trichlorosilane and silicon tetrachloride using a hydrogen gas as a sealing gas.

It is another object of the present invention to provide a method of storing trichlorosilane which is advantageously used in a process for producing high-quality polycrystal silicon using trichlorosilane as a silicon source.

It is still another object of the present invention to provide a method of storing trichlorosilane which inhibits the formation of a nitride in polycrystal silicon to provide high-quality polycrystal silicon as a raw material for high-density ICs whose yield is expected to be increased at the end.

It is still another object of the present invention to provide an industrially highly valued process for producing polycrystal silicon by reacting trichlorosilane with hydrogen, which comprises the steps of storing trichlorosilane as a raw material and/or silicon tetrachloride by-produced in the above reaction, using a hydrogen gas as a sealing gas, and converting the silicon tetrachloride into trichlorosilane.

Other objects and advantages of the present invention will become apparent from the following description.

According to the present invention, firstly, the above objects and advantages of the present invention can be attained by a method of storing trichlorosilane using a hydrogen gas as a sealing gas for a trichlorosilane storage tank.

Secondly, the above objects and advantages of the present invention can be attained by a method of storing silicone tetrachloride using a hydrogen gas as a sealing gas for a silicon tetrachloride storage tank.

Thirdly, the above objects and advantages of the present invention can be attained by a process for producing polycrystal silicon comprising the step (1) of forming polycrystal silicon by reacting trichlorosilane with hydrogen, the step (2) of forming trichlorosilane by reacting silicon tetrachloride, by-produced in the polycrystal silicon-forming step (1), with hydrogen and metal silicon, and the step of supplying trichlorosilane, containing at least part of the trichlorosilane obtained in the trichlorosilane-forming step (2), to the polycrystal silicon forming step, wherein trichlorosilane used in the polycrystal silicon-forming step (1) and/or silicon tetrachloride used in the trichlorosilane-forming step (2) are stored in storage tank(s) using a hydrogen as a sealing gas and supplied to the respective steps from the tank(s).

DETAILED DESCRIPTION OF THE INVENTION

The trichlorosilane storage tank used in the method of the present invention is not limited to a particular shape as far as it can store liquid trichlorosilane. However, since the boiling point of trichlorosilane is about 32° C. at normal pressure, the tank is preferably a pressure-resistant container in consideration of accidental heating caused by an external factor.

Figure 1:
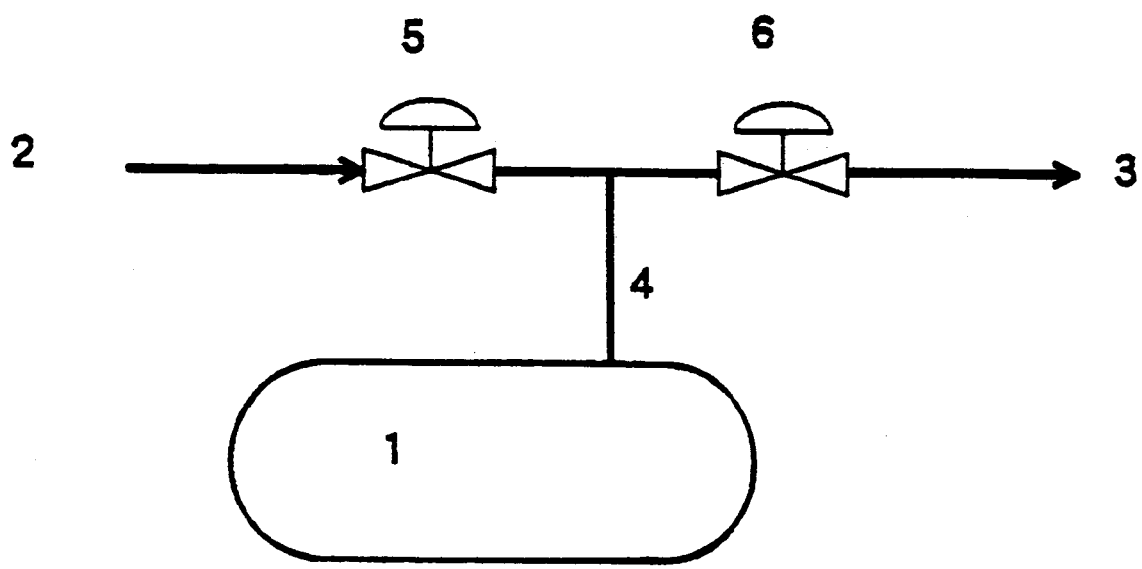
FIG. 1 is a schematic diagram of sealing means for a storage tank for carrying out the storage method of the present invention.

Since trichlorosilane is an ignitable substance, it must not be contacted with the outside air. Therefore, the pressure inside the tank must be maintained at a higher level than that of the outside air by supplying gas into the tank. Although the structure of the sealing means is not particularly limited, a sealing means shown in FIG. 1 can be used, for example. In FIG. 1, reference numeral 1 denotes a trichlorosilane storage tank, 2 a sealing gas supply line, and 3 a gas exhaust line which can communicate with a scrubber. Reference numeral 4 denotes a line for communicating the pressure in the tank to the sealing means. Numerals 5 and 6 denote pressure control valves. The pressure control valve 5 is opened when the pressure of the line 4 falls below a predetermined value. The pressure control valve 6 is opened when the pressure of the line 4 exceeds a predetermined value.

The pressure control of the tank is carried out as follows. When the pressure in the tank increases due to a rise in the outside air temperature, the pressure of the line 4 exceeds the predetermined value. At this point, the pressure control valve 6 is opened to exhaust gas within the tank, thereby reducing the pressure in the tank. On the other hand, when the pressure in the tank decreases due to a drop in the outside air temperature, the pressure control valve 6 is kept closed. Since the pressure of the line 4 falls below the predetermined value at this point, the pressure control valve 5 is opened to introduce a sealing gas into the tank. Thus, the pressure in the tank can be always maintained at a predetermined value.

Nitrogen is not preferable as a gas used as the sealing means for the tank because of the above reasons. In contrast, since hydrogen is a gas used to precipitate polycrystal silicon, it may dissolve in trichlorosilane. However, as hydrogen is a combustible gas, it is extremely dangerous. Although an attempt to use hydrogen, with the understanding of its danger as described above, for nitrogen as a sealing gas has been considered too extreme, it has been made clear that hydrogen is the most preferable to seal the tank with hydrogen because it is also a gas to be supplied as a raw material for precipitating polycrystal silicon. When hydrogen is used as a sealing gas, however, it must be noted that a tank and sealing means designed for hydrogen should be selected because hydrogen is a gas which leaks very easily.

As the hydrogen as a sealing gas, there is preferably used a hydrogen gas having a purity as high as that to be supplied to precipitate polycrystal silicon and a content of impurities as small as possible. As hydrogen chloride, which may be contained in hydrogen, and chlorosilanes cause the corrosion of the pressure control valve, it is more preferable that the hydrogen gas should not contain these acid components. The hydrogen gas that can be favorably used in the present invention preferably has a purity of 99% or more, particularly preferably 99.9% or more.

Sealing with a hydrogen gas can be applied not only to the storage tank of trichlorosilane to be used in the precipitation reaction of polycrystal silicon but also to other storage tanks. For example, it can be used as a sealing gas for the storage tank of silicon tetrachloride used in the step of producing trichlorosilane by reacting silicon, hydrogen and silicon tetrachloride. The above reaction is a reaction for supplying hydrogen to silicon tetrachloride and its reactivity is theoretically 25%, which is extremely low. Therefore, hydrogen and silicon tetrachloride to be supplied into the reactor are recycled. In this case, nitrogen stored as a sealing gas and dissolved in silicon tetrachloride is gasified in the reactor and mixed with gaseous hydrogen. Nitrogen is supplied into the collected silicon tetrachloride in the tank again and mixed with hydrogen. Because of the above reason, the concentration of nitrogen contained in the hydrogen recycled in the reaction system increases gradually without limit. When nitrogen is supplied to a reaction, it has no direct adverse effect because it exists as an inert gas. However, as the concentration of an inert component in the reactor increases, the contact efficiency of silicon tetrachloride, hydrogen and silicon lowers, thereby reducing reactivity. On the other hand, when hydrogen is used as a sealing gas, hydrogen dissolved in silicon tetrachloride is directly supplied as a reaction gas. For this reason, an increase in the concentration of nitrogen contained in hydrogen can be prevented by using hydrogen as a sealing gas for the storage tank of silicon tetrachloride, thereby making it possible to prevent a reduction in the reactivity of the reaction.

Figure 2:
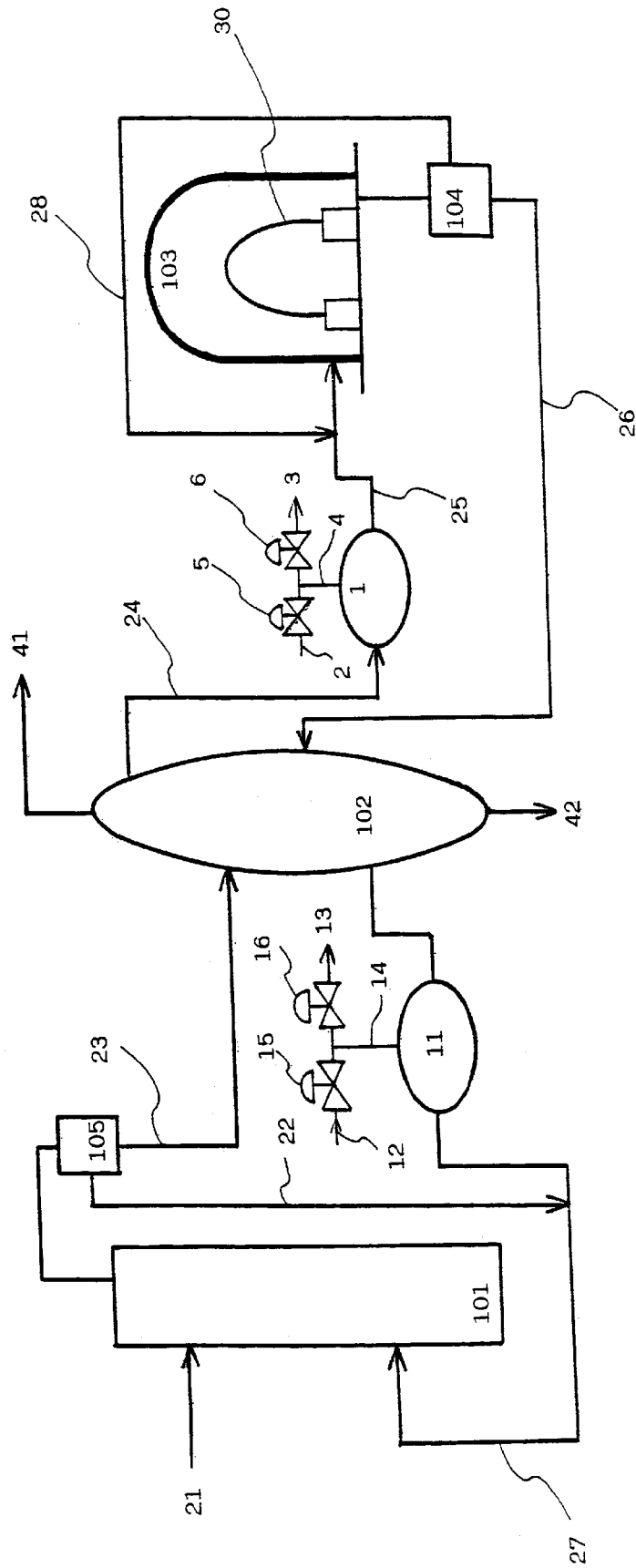
FIG. 2 is a schematic diagram showing a production process for polycrystal silicon adopting the storage method of the present invention.

The accompanied FIG. 2 is a schematic diagram showing a polycrystal silicon production process adopting the storage method of the present invention.

In FIG. 2, trichlorosilane is supplied into a precipitation reactor 103 from the trichlorosilane storage tank 1 through a line 25. At this point, the trichlorosilane joins hydrogen supplied from a line 28 at some point of the line 25 and is supplied into the precipitation reactor 103 together with the hydrogen. A filament silicon rod 30 is installed in the precipitation reactor 103 and a current is applied to the reactor 103 to heat it to a high temperature of 900 to 1,200° C. Silicon is gradually deposited on the silicon rod 30 with the passage of time and taken out as a product when it grows to a desired thickness. Exhaust gas from the precipitation reactor 103 is introduced into a hydrogen gas separator 104. The separated hydrogen gas is recycled and used for a precipitation reaction through the line 28. The residue from the hydrogen gas separator 104 is supplied into a distillation apparatus 102 through a line 26 to separate trichlorosilane from silicon tetrachloride. A light end is removed from an exhaust port 41 and a heavy end is removed from an exhaust port 42. The separated trichlorosilane is stored in a trichlorosilane storage tank 1 through a line 24. The storage tank 1 is sealed up with a hydrogen gas in accordance with the method of the present invention. The pressure in the storage tank 1 is controlled by a pressure control valve 5 for supplying a hydrogen gas from a supply line 2 and a pressure control valve 6 for exhausting a hydrogen gas from an exhaust line 3, through a line 4.

The silicon tetrachloride separated in the distillation apparatus 102 is stored in a silicon tetrachloride storage tank 11. The storage tank 11 is also sealed up with a hydrogen gas in accordance with the method of the present invention. The pressure in the storage tank 11 is adjusted by a line 14, a supply line 12, an exhaust line 13 and pressure control valves 15 and 16, like the case of the storage tank 1.

Silicon tetrachloride is supplied into a reduction reactor 101 through a line 27. At this point, silicon tetrachloride joins a hydrogen gas supplied through a line 22 and is supplied into the reduction reactor 101 together with the hydrogen gas. Silicon is supplied into the reduction reactor 101 from a supply port 21 and a reaction for forming trichlorosilane and hydrogen takes place. The reaction favorably proceeds at a temperature of 350 to 700° C. The reaction mixture form the reduction reactor 101 is introduced into a hydrogen gas separator 105. The separated hydrogen gas is supplied into the line 27 through the line 22 as described above. The residue from the hydrogen gas separator 105 is supplied into the distillation apparatus 102 through a line 23 and distilled, similarly to a feed from the line 26.

As described above, according to the method of the present invention, high-purity polycrystal silicon can be favorably produced on an industrial scale by the polycrystal silicon production process adopting the storage method of the present invention.

The following examples are given to further illustrate the present invention.

EXAMPLE 1

A sealing means shown in FIG. 1 was provided in a storage tank of trichlorosilane to be supplied into a precipitation reactor, and trichlorosilane was stored using hydrogen having a purity of 99.9999% as a sealing gas (absolute pressure: 170 Kpa). This trichlorosilane was reacted with hydrogen in accordance with a commonly used method to produce polycrystal silicon. No abnormality was observed in the polycrystal silicon obtained as a product after 30 days. No increase in the total amount of impurities containing nitrogen in a recycled hydrogen was observed.

COMPARATIVE EXAMPLE 1

The operation was carried out under the same conditions as in Example 1 except that nitrogen was used as a sealing gas for the storage tank of trichlorosilane. In this case, the operation was stopped after 8 hours because the concentration of nitrogen contained in a recycled hydrogen was increased.

EXAMPLE 2

A sealing means shown in FIG. 1 was provided in a storage tank of silicon tetrachloride to use hydrogen as a sealing gas. This silicon tetrachloride was mixed with hydrogen, the resulting mixture was supplied into a fluidized bed filled with metal silicon, and the production operation of trichlorosilane was carried out. No abnormality was observed even a week after the start of operation. No increase in the total amount of impurities including nitrogen contained in a recycled hydrogen was observed, either.

COMPARATIVE EXAMPLE 2

The operation was carried out under the same conditions as in Example 2 except that nitrogen was used as a sealing gas for the storage tank of silicon tetrachloride. Since the concentration of nitrogen contained in a recycled hydrogen was increased to 10% 14 hours after the start of operation, the reactivity of a conversion reaction from silicon tetrachloride into trichlorosilane lowered.

According to the storage method of the present invention, trichlorosilane for the production of polycrystal silicon can be stored without affecting the production of polycrystal silicon, and silicon tetrachloride for the production of trichlorosilane can also be stored.

EXAMPLE 3

Trichlorosilane (TCS) purified by the distillation apparatus 102 shown in FIG. 2 was mixed with a recycled hydrogen supplied from the line 28 through the storage tank 1 of trichlorosilane, and supplied into the precipitation reactor 103.

The line 4 was provided from the tank 1 as a sealing means against pressure fluctuations in the storage tank 1 of TCS. The end of the line 4 forked the exhaust line 3 for reducing pressure and the supply line 2 for applying pressure, and the pressure control valves 5 and 6 were provided in each of the above two lines. When the pressure in the tank exceeded a predetermined value, the pressure control valve 5 was closed and the pressure control valve 6 was opened, while when the pressure in the tank fell below a predetermined value, the pressure control vale 5 was opened and the pressure control valve 6 was closed. A pressure gas supplied to the line 2 was a hydrogen gas 99.999% having a nitrogen gas concentration of 5 ppm and a dew point below −100° F.

The production of polycrystal silicon was carried out for 30 consecutive days in accordance with the above method and no abnormality was observed in the produced polycrystal silicon. No increase in the total amount of nitrogen and other impurities contained in a recycled hydrogen was observed, either.

EXAMPLE 4

Silicon tetrachloride separated and purified by the distillation apparatus 102 shown in FIG. 2 was supplied into the reduction reactor 101 through the line 27 together with hydrogen supplied from the line 22 through the storage tank 11 to carry out the operation of producing trichlorosilane. Hydrogen, trichlorosilane and silicon tetrachloride discharged from the reduction reactor 101 were separated from one another in the hydrogen gas separator 105 and hydrogen was recycled.

The line 14 was provided from the tank 11 as sealing means against pressure fluctuations in the storage tank 11 of silicon tetrachloride. The end of the line 14 forked the exhaust line 13 for reducing pressure and the supply line 12 for applying pressure, and the pressure control valves 15 and 16 were provided in each of the above two lines. When the pressure in the tank exceeded a predetermined value, the pressure control valve 15 was closed and the pressure control valve 16 was opened, while when the pressure in the tank fell below a predetermined value, the pressure control valve 15 was opened and the pressure control valve 16 was closed. A pressure gas to be supplied to the line 12 was a hydrogen gas 99.999% having a nitrogen gas concentration of 5 ppm and a dew point below −100° F.

No abnormality was observed a week after the start of operation. No increase in the total amount of impurities including nitrogen contained in a recycled hydrogen was observed, either.

What is claimed is:

1. A process for producing polycrystal silicon comprising:

the step (1) of forming polycrystal silicon by reacting trichlorosilane with hydrogen;

the step (2) of forming trichlorosilane by reacting silicon tetrachloride, by-produced in the polycrystal silicon-forming step (1), with hydrogen and silicon; and the step of supplying trichlorosilane, containing at least part of the trichlorosilane obtained in the trichlorosilane-forming step (2), to the polycrystal silicon-forming step (1), wherein trichlorosilane used in the polycrystal silicon-forming step (1) and/or silicon tetrachloride used in the trichlorosilane-forming step (2) are stored in storage tank(s) using a hydrogen gas as a sealing gas to control the pressure inside the tank at a higher level than that of the outside air and supplied to the respective steps from the tank(s).

2. A storage method for storing trichlorosilane in a trichlorosilane storage tank, which comprises introducing hydrogen gas as sealing gas into the tank through pressure control valve thereof to control the pressure inside the tank at a higher level than that of the outside air.

3. A storage method for storing silicone tetrachloride in a silicone tetrachloride storage tank, which comprises introducing hydrogen gas as sealing gas into the tank through pressure control valve thereof to control the pressure inside the tank at a higher level than that of the outside air.

4. The storage method for storing silicon tetrachloride of claim 3, wherein said silicone tetrachloride is a raw material for producing trichlorosilane by reacting with the silicon tetrachloride with hydrogen.

5. The storage method of claim 2, wherein the hydrogen gas does not contain chlorosilane or hydrogen chloride.

6. The storage method of claim 3, wherein the hydrogen gas does not contain chlorosilane or hydrogen chloride.

7. The storage method of claim 2, wherein the hydrogen gas has a purity of 99% or more.

8. The storage method of claim 3, wherein the hydrogen gas has a purity of 99% or more.

9. The storage method of claim 2, wherein the hydrogen gas has a purity of 99.9% or more.

10. The storage method of claim 3, wherein the hydrogen gas has a purity of 99.9% or more.

11. The storage method of claim 2, wherein the hydrogen gas has a purity of 99.9999% or more.

12. The storage method of claim 3, wherein the hydrogen gas has a purity of 99.9999% or more.

13. The storage method of claim 2, wherein the tank is provided with a line for communicating the pressure in the tank to a first and a second pressure control valve, wherein the first pressure control is opened when the pressure of said line for communicating the pressure in the tank to the pressure valves falls below a predetermined value, and the second pressure control valve is opened when the pressure in said line for communicating the pressure in the tank to the first and second pressure valves exceeds a predetermined value, such that when the pressure in the tank increases due to a rise in outside air temperature, the pressure in said line for communicating the pressure in the tank to the first and second pressure valves exceeds the predetermined value and the second pressure control valve is opened to exhaust gas within the tank, thereby reducing the pressure in the tank, and when the pressure in the tank decreases due to a drop in outside air temperature, the second pressure control valve is closed, and when the pressure of said line for communicating the pressure in the tank to the pressure valves is below a predetermined value, the first pressure control valve is opened to introduce the sealing gas into the tank, thereby maintaining the pressure in the tank at a predetermined value.

14. The storage method of claim 3, wherein the tank is provided with a line for communicating the pressure in the tank to a first and a second pressure control valve, wherein the first pressure control is opened when the pressure of said line for communicating the pressure in the tank to the pressure valves falls below a predetermined value, and the second pressure control valve is opened when the pressure in said line for communicating the pressure in the tank to the first and second pressure valves exceeds a predetermined value, such that when the pressure in the tank increases due to a rise in outside air temperature, the pressure in said line for communicating the pressure in the tank to the first and second pressure valves exceeds the predetermined value and the second pressure control valve is opened to exhaust gas within the tank, thereby reducing the pressure in the tank, and when the pressure in the tank decreases due to a drop in outside air temperature, the second pressure control valve is closed, and when the pressure of said line for communicating the pressure in the tank to the pressure valves is below a predetermined value, the first pressure control valve is opened to introduce the sealing gas into the tank, thereby maintaining the pressure in the tank at a predetermined value.

15. The storage method for storing trichlorosilane of claim 2, wherein said trichlorosilane is a raw material for producing high-purity polycrystal silicon by reacting said trichlorosilane with hydrogen.

* * * * *